(12) United States Patent
Weber

(10) Patent No.: US 10,450,950 B2
(45) Date of Patent: Oct. 22, 2019

(54) TURBOMACHINE BLADE WITH TRAILING EDGE COOLING CIRCUIT

(71) Applicant: General Electric Company, Schenectady, NY (US)

(72) Inventor: David Wayne Weber, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 470 days.

(21) Appl. No.: 15/334,448

(22) Filed: Oct. 26, 2016

(65) Prior Publication Data

US 2018/0112533 A1    Apr. 26, 2018

(51) Int. Cl.
*F01D 5/18*   (2006.01)
*F02C 3/04*   (2006.01)

(52) U.S. Cl.
CPC ................. *F02C 3/04* (2013.01); *F01D 5/187* (2013.01); *F05D 2220/32* (2013.01); *F05D 2240/303* (2013.01); *F05D 2240/304* (2013.01); *F05D 2240/305* (2013.01); *F05D 2240/307* (2013.01); *F05D 2250/185* (2013.01); *F05D 2260/202* (2013.01)

(58) Field of Classification Search
CPC .................................. F01D 5/186; F01D 5/187
See application file for complete search history.

(56) References Cited

U.S. PATENT DOCUMENTS

| 2,744,723 | A | 5/1956 | Roush |
| 3,220,697 | A | 11/1965 | Smuland et al. |
| 3,844,679 | A | 10/1974 | Grondahl et al. |
| 3,849,025 | A | 11/1974 | Grondahl |
| 4,021,139 | A | 5/1977 | Franklin |
| 4,302,153 | A | 11/1981 | Tubbs |
| 4,684,322 | A | 8/1987 | Clifford et al. |

(Continued)

FOREIGN PATENT DOCUMENTS

| EP | 1533474 A2 | 5/2005 |
| EP | 1793085 A2 | 6/2007 |

OTHER PUBLICATIONS

U.S. Appl. No. 15/334,563 Office Action dated Dec. 12, 2018, 18 pages.

(Continued)

*Primary Examiner* — Woody A Lee, Jr.
(74) *Attorney, Agent, or Firm* — Dale Davis; Hoffman Warnick LLC

(57) ABSTRACT

A turbomachine blade according to various embodiments includes: a body having: a leading edge; a trailing edge; a suction side extending between the leading edge and the trailing edge; a pressure side, opposing the suction side; a root; and a tip opposing the root; and a trailing edge cooling circuit contained within the body, the trailing edge cooling circuit including: a first section extending from the root toward the tip along the pressure side; a second section extending from the first section toward the trailing edge; and a third section extending from the trailing edge along the suction side, wherein the trailing edge cooling circuit is configured to direct flow of a heat transfer fluid from the first section to the second section, and from the second section to the third section, without releasing the heat transfer fluid from the body at the trailing edge.

17 Claims, 9 Drawing Sheets

(56) References Cited

U.S. PATENT DOCUMENTS

| | | | |
|---|---|---|---|
| 4,761,116 A | 8/1988 | Braddy et al. | |
| 4,940,388 A | 7/1990 | Lilleker et al. | |
| 5,100,293 A | 3/1992 | Anzai et al. | |
| 5,236,309 A | 8/1993 | Van Heusden et al. | |
| 5,350,277 A * | 9/1994 | Jacala | F01D 5/185 |
| | | | 416/90 R |
| 5,464,322 A * | 11/1995 | Cunha | F01D 5/187 |
| | | | 415/115 |
| 5,536,143 A | 7/1996 | Jacala et al. | |
| 5,915,923 A | 6/1999 | Tomita et al. | |
| 5,967,752 A | 10/1999 | Lee et al. | |
| 5,997,251 A | 12/1999 | Lee | |
| 6,099,252 A | 8/2000 | Manning et al. | |
| 6,227,804 B1 * | 5/2001 | Koga | F01D 5/187 |
| | | | 415/115 |
| 6,247,896 B1 | 6/2001 | Auxier et al. | |
| 6,422,817 B1 * | 7/2002 | Jacala | F01D 5/187 |
| | | | 415/114 |
| 6,499,949 B2 | 12/2002 | Schafrik et al. | |
| 6,547,522 B2 | 4/2003 | Turquist et al. | |
| 6,547,525 B2 | 4/2003 | Haehnle et al. | |
| 7,435,053 B2 | 10/2008 | Liang | |
| 7,530,789 B1 | 5/2009 | Liang | |
| 7,670,113 B1 | 3/2010 | Liang | |
| 7,717,675 B1 | 5/2010 | Liang | |
| 7,785,070 B2 | 8/2010 | Liang | |
| 7,845,906 B2 | 12/2010 | Spangler et al. | |
| 7,985,049 B1 | 7/2011 | Liang | |
| 8,047,788 B1 | 11/2011 | Liang | |
| 8,142,153 B1 * | 3/2012 | Liang | F01D 9/04 |
| | | | 416/1 |
| 8,317,472 B1 | 11/2012 | Liang | |
| 8,322,988 B1 | 12/2012 | Downs et al. | |
| 8,398,370 B1 | 3/2013 | Liang | |
| 8,444,386 B1 | 5/2013 | Liang | |
| 8,562,295 B1 | 10/2013 | Liang | |
| 8,608,430 B1 | 12/2013 | Liang | |
| 8,628,298 B1 | 1/2014 | Liang | |
| 8,678,766 B1 | 3/2014 | Liang | |
| 8,790,083 B1 | 7/2014 | Liang | |
| 8,864,469 B1 | 10/2014 | Liang | |
| 9,145,780 B2 * | 9/2015 | Propheter-Hinckley | F01D 5/186 |
| 9,447,692 B1 | 9/2016 | Liang | |
| 9,970,302 B2 | 5/2018 | Lacy et al. | |
| 2005/0058534 A1 | 3/2005 | Lee et al. | |
| 2009/0028702 A1 * | 1/2009 | Pietraszkiewicz | F01D 5/186 |
| | | | 416/1 |
| 2009/0193657 A1 | 8/2009 | Wilson, Jr. et al. | |
| 2010/0303625 A1 | 12/2010 | Kuhne et al. | |
| 2013/0108471 A1 | 5/2013 | Fujimoto | |
| 2013/0272850 A1 | 10/2013 | Bunker | |
| 2014/0093379 A1 | 4/2014 | Tibbott et al. | |
| 2014/0127013 A1 | 5/2014 | Spangler et al. | |
| 2015/0041590 A1 | 2/2015 | Kirtley et al. | |
| 2015/0044059 A1 | 2/2015 | Wassynger et al. | |
| 2015/0096305 A1 | 4/2015 | Morgan et al. | |
| 2015/0147164 A1 | 5/2015 | Cui et al. | |
| 2015/0252728 A1 | 9/2015 | Veiga | |
| 2015/0345303 A1 | 12/2015 | Dong et al. | |
| 2016/0169003 A1 | 6/2016 | Wong et al. | |
| 2016/0177741 A1 | 6/2016 | Kirollos et al. | |
| 2017/0234154 A1 | 8/2017 | Downs | |
| 2017/0350259 A1 | 12/2017 | Dutta et al. | |
| 2018/0230815 A1 | 8/2018 | Jones | |

OTHER PUBLICATIONS

U.S. Appl. No. 15/334,474 Office Action dated Dec. 31, 2018, 13 pages.

U.S. Appl. No. 15/334,450, Notice of Allowance dated Jan. 10, 2019, 12 pages.

U.S. Appl. No. 15/334,501, Notice of Allowance dated Jan. 17, 2019, 11 pages.

U.S. Appl. No. 15/334,454, Notice of Allowance dated Jan. 24, 2019, 23 pages.

U.S. Appl. No. 15/334,585, Final Office Action dated Feb. 8, 2019, 20 pages.

U.S. Appl. No. 15/334,517, Notice of Allowance dated Mar. 20, 2019, 9 pgs.

U.S. Appl. No. 15/334,563, Notice of Allowance dated Apr. 9, 2019, 8 pgs.

U.S. Appl. No. 15/334,483, Office Action dated Jun. 28, 2018, 13 pages.

U.S. Appl. No. 15/334,585, Office Action dated Jul. 31, 2018, 22 pages.

U.S. Appl. No. 15/334,517, Office Action dated Aug. 6, 2018, 24 pages.

U.S. Appl. No. 15/334,501, Office Action dated Aug. 10, 2018, 17 pages.

U.S. Appl. No. 15/334,450, Office Action dated Aug. 15, 2018, 49 pages.

U.S. Appl. No. 15/334,474, Notice of Allowance dated Apr. 17, 2019, 16 pgs.

EP Search Report for corresponding European Patent Application No. 17198212 dated May 9, 2018, 7 pages.

U.S. Appl. No. 15/334,471, Office Action dated Jul. 11, 2019, (GEEN-0854-US), 13 pages.

U.S. Appl. No. 15/334,585 Notice of Allowance dated Jun. 7, 2019, (GEEN-0848-US), 21 pgs.

U.S. Appl. No. 15/334,483, Notice of Allowance dated Jun. 20, 2019, (GEEN-0881-US), 8 pages.

* cited by examiner

TURBOMACHINE BLADE WITH TRAILING EDGE COOLING CIRCUIT

CROSS-REFERENCE TO RELATED APPLICATIONS

This application is related to co-pending US application numbers: Ser. Nos. 15/334,474, 15/334,454, 15/334,563, 15/334,585, 15/334,501, 15/334,517, 15/334,450, 15/334,471 and Ser. No. 15/334,483, all filed on Oct. 26, 2016.

TECHNICAL FIELD

The subject matter of this application relates to heat transfer in turbomachinery. In particular, the subject matter disclosed herein relates to cooling circuits in turbomachinery components.

BACKGROUND

Gas turbomachines, including gas turbine systems (or simply, gas turbines) are one example of turbomachines widely utilized in fields such as power generation. A conventional gas turbine system includes a compressor section, a combustor section, and a turbine section. During operation of a gas turbine system, various components in the system, such as turbine blades, are subjected to high temperature flows, which can cause the components to fail. As higher temperature flows generally result in increased performance, efficiency, and power output of a gas turbine system, it is beneficial to cool the components that are subjected to high temperature flows to allow the gas turbine system to operate at increased temperatures.

Turbine blades typically contain an intricate maze of internal cooling channels. Cooling air, provided by, for example, a compressor of a gas turbine system, may be passed through the internal cooling channels to cool the turbine blades. In many conventional configurations, internal cooling channels outlet to the trailing edge of a turbine blade. However, ejecting cooling flow at the trailing edge can be inefficient, wasting useful heat transfer capacity.

BRIEF DESCRIPTION

A turbomachine blade according to various embodiments includes: a body having: a leading edge; a trailing edge opposing the leading edge; a suction side extending between the leading edge and the trailing edge; a pressure side, opposing the suction side, extending between the leading edge and the trailing edge; a root; and a tip opposing the root; and a trailing edge cooling circuit contained within the body, the trailing edge cooling circuit including: a first section extending from the root toward the tip along the pressure side; a second section extending from the first section toward the trailing edge; and a third section extending from the trailing edge along the suction side, wherein the trailing edge cooling circuit is configured to direct flow of a heat transfer fluid from the first section to the second section, and from the second section to the third section, without releasing the heat transfer fluid from the body at the trailing edge.

A first aspect of the disclosure provides a turbomachine blade including: a body having: a leading edge; a trailing edge opposing the leading edge; a suction side extending between the leading edge and the trailing edge; a pressure side, opposing the suction side, extending between the leading edge and the trailing edge; a root; and a tip opposing the root; and a trailing edge cooling circuit contained within the body, the trailing edge cooling circuit including: a first section extending from the root toward the tip along the pressure side; a second section extending from the first section toward the trailing edge; and a third section extending from the trailing edge along the suction side, wherein the trailing edge cooling circuit is configured to direct flow of a heat transfer fluid from the first section to the second section, and from the second section to the third section, without releasing the heat transfer fluid from the body at the trailing edge.

A second aspect of the disclosure provides a turbomachine having: a gas turbine system including a compressor component, a combustor component, and a turbine component, the turbine component including at least one turbomachine blade including: a body having: a leading edge; a trailing edge opposing the leading edge; a suction side extending between the leading edge and the trailing edge; a pressure side, opposing the suction side, extending between the leading edge and the trailing edge; a root; and a tip opposing the root; and a trailing edge cooling circuit contained within the body, the trailing edge cooling circuit including: a first section extending from the root toward the tip along the pressure side; a second section extending from the first section toward the trailing edge; and a third section extending from the trailing edge along the suction side, wherein the trailing edge cooling circuit is configured to direct flow of a heat transfer fluid from the first section to the second section, and from the second section to the third section, without releasing the heat transfer fluid from the body at the trailing edge.

A third aspect of the disclosure provides a turbomachine blade including: a body having: a leading edge; a trailing edge opposing the leading edge; a suction side extending between the leading edge and the trailing edge; a pressure side, opposing the suction side, extending between the leading edge and the trailing edge; a root; and a tip opposing the root; and a trailing edge cooling circuit contained within the body, the trailing edge cooling circuit including: a first section extending from the root toward the tip along the pressure side; a second section extending from the first section toward the trailing edge; a third section extending from the trailing edge along the suction side, wherein the trailing edge cooling circuit is configured to direct flow of a heat transfer fluid from the first section to the second section, and from the second section to the third section, without releasing the heat transfer fluid from the body at the trailing edge; a pressure side heat transfer element within the second section for distributing the heat transfer fluid to a fluid passage; a suction side heat transfer element within the third section; and a set of film holes fluidly connected with the third section proximate the suction side.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure.

Figure 1:
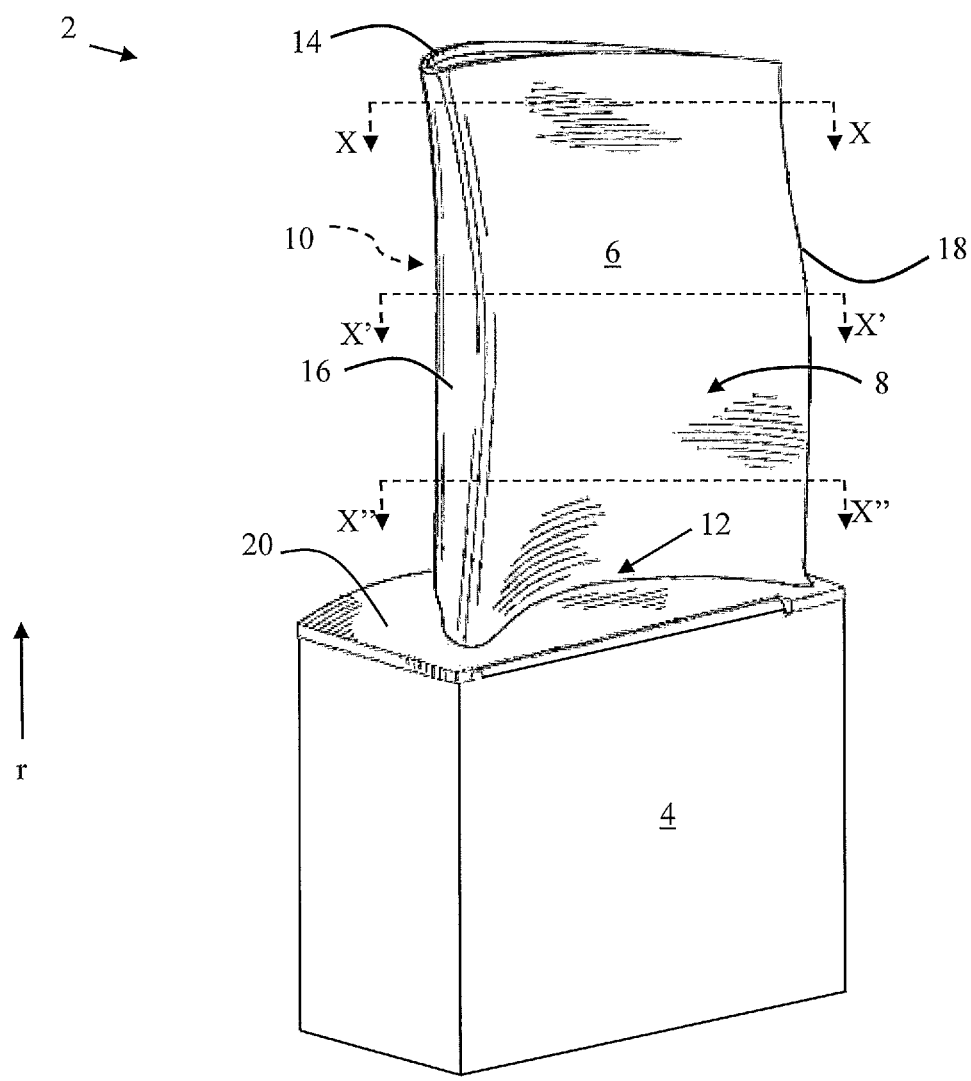
FIG. 1 shows a perspective view of a turbomachine blade according to embodiments.

It is noted that the drawings of the disclosure are not necessarily to scale. The drawing is intended to depict only typical aspects of the disclosure, and therefore should not be considered as limiting the scope of the disclosure. In the drawing, like numbering represents like elements between the drawings.

DETAILED DESCRIPTION

As indicated above, the disclosure relates generally to turbine systems, and more particularly, to turbomachine blades having trailing edge cooling circuits.

In contrast to conventional configurations, various aspects of the disclosure relate to turbomachine blades having trailing edge cooling circuits with features that collect cooling flow and redirect that flow back toward other regions of the blade, e.g., for additional cooling and/or reuse.

In the Figures, the "A" axis represents an axial orientation. As used herein, the terms "axial" and/or "axially" refer to the relative position/direction of objects along axis A, which is substantially parallel with the axis of rotation of the turbomachine (in particular, the rotor section). As further used herein, the terms "radial" and/or "radially" refer to the relative position/direction of objects along an axis "r", which is substantially perpendicular with axis A and intersects axis A at only one location. Additionally, the terms "circumferential" and/or "circumferentially" refer to the relative position/direction of objects along a circumference (c) which surrounds axis A but does not intersect the axis A at any location.

Turning to FIG. 1, a perspective view of a turbomachine blade 2 is shown. Turbomachine blade 2 can include a shank 4 and a body 6 coupled to and extending radially outward from shank 4. Body 6 can include a pressure side 8, an opposing suction side 10, a root (proximate shank 4) 12 and a tip 14 (radially outboard of shank 4) opposing root 12. Body 6 further includes a leading edge 16 between pressure side 8 and suction side 10, as well as a trailing edge 18 between pressure side 8 and suction side 10 on a side opposing leading edge 16. Body 6 can extend radially from a platform 20 on shank 4.

Shank 4 and body 6 may each be formed of one or more metals (e.g., nickel, alloys of nickel, etc.) and may be formed (e.g., cast, forged additively manufactured or otherwise machined) according to conventional approaches. Shank 4 and body 6 may be integrally formed (e.g., cast, forged, three-dimensionally printed, etc.), or may be formed as separate components which are subsequently joined (e.g., via welding, brazing, bonding or other coupling mechanism).

Figure 2:
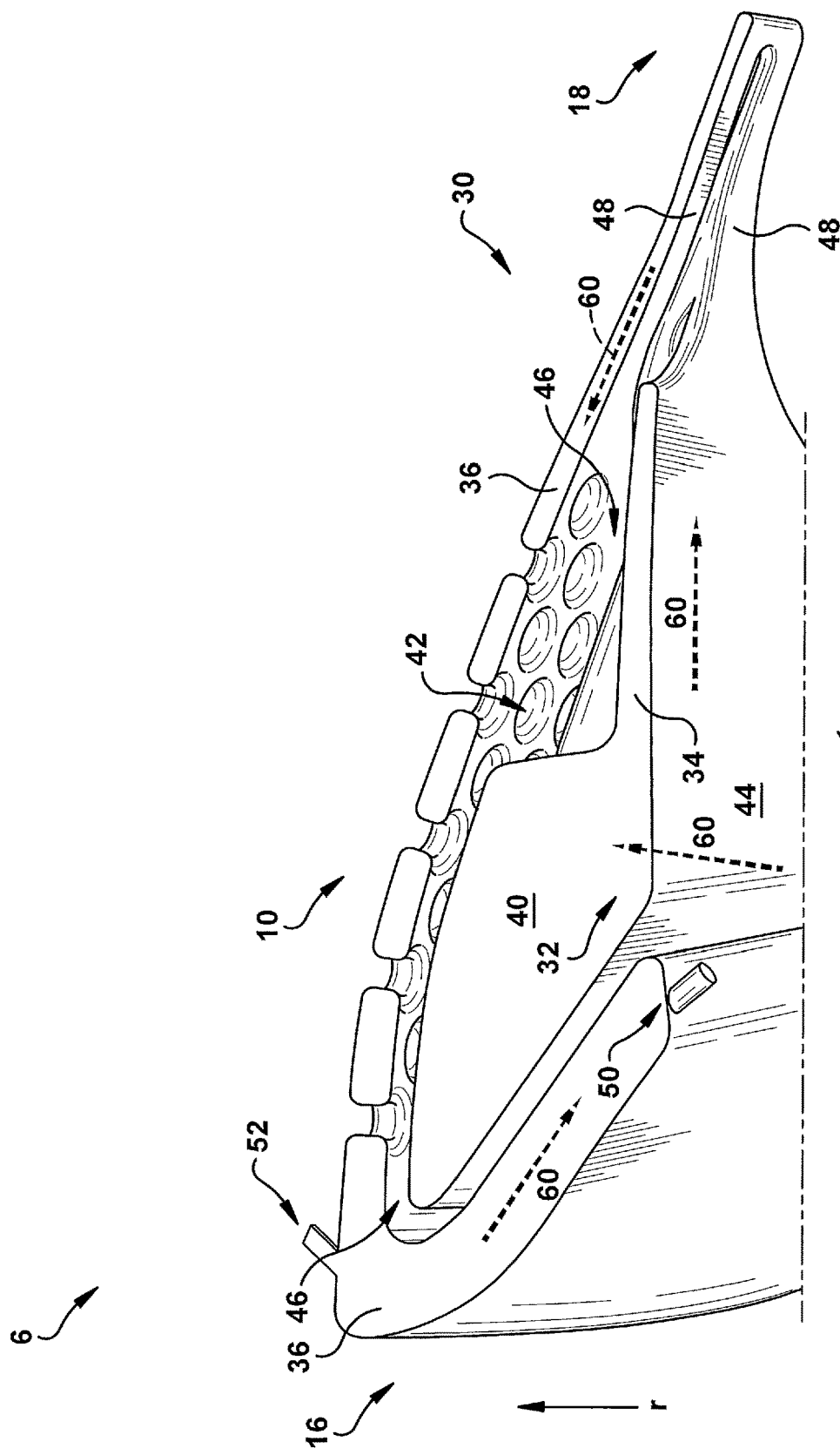
FIG. 2 is a cross-sectional view of a cooling circuit within the turbomachine blade of FIG. 1, taken along line X"-X" in FIG. 1.
Figure 3:
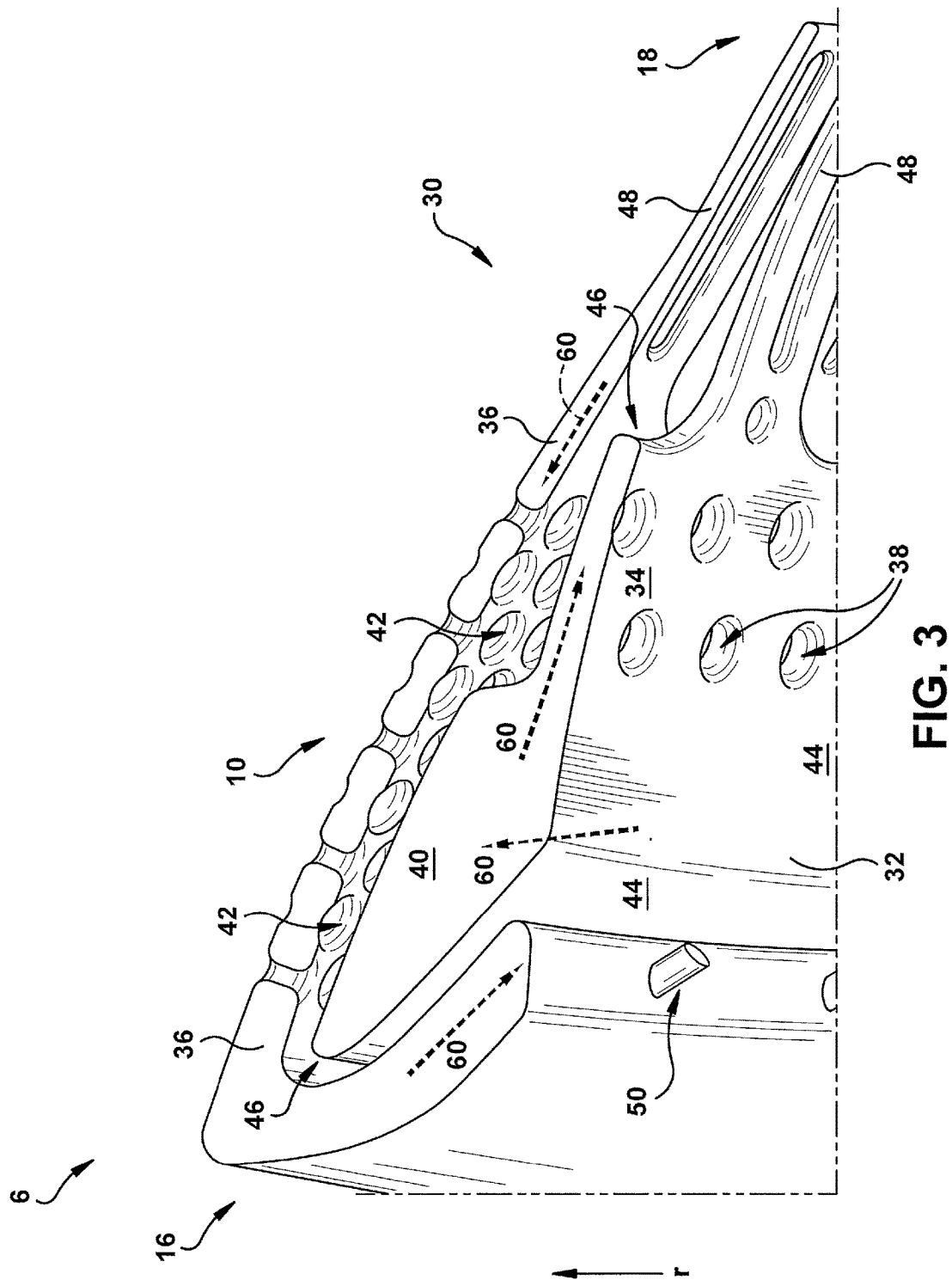
FIG. 3 is a cross-sectional view of a cooling circuit within the turbomachine blade of FIG. 1, taken along line X'-X' in FIG. 1.
Figure 4:
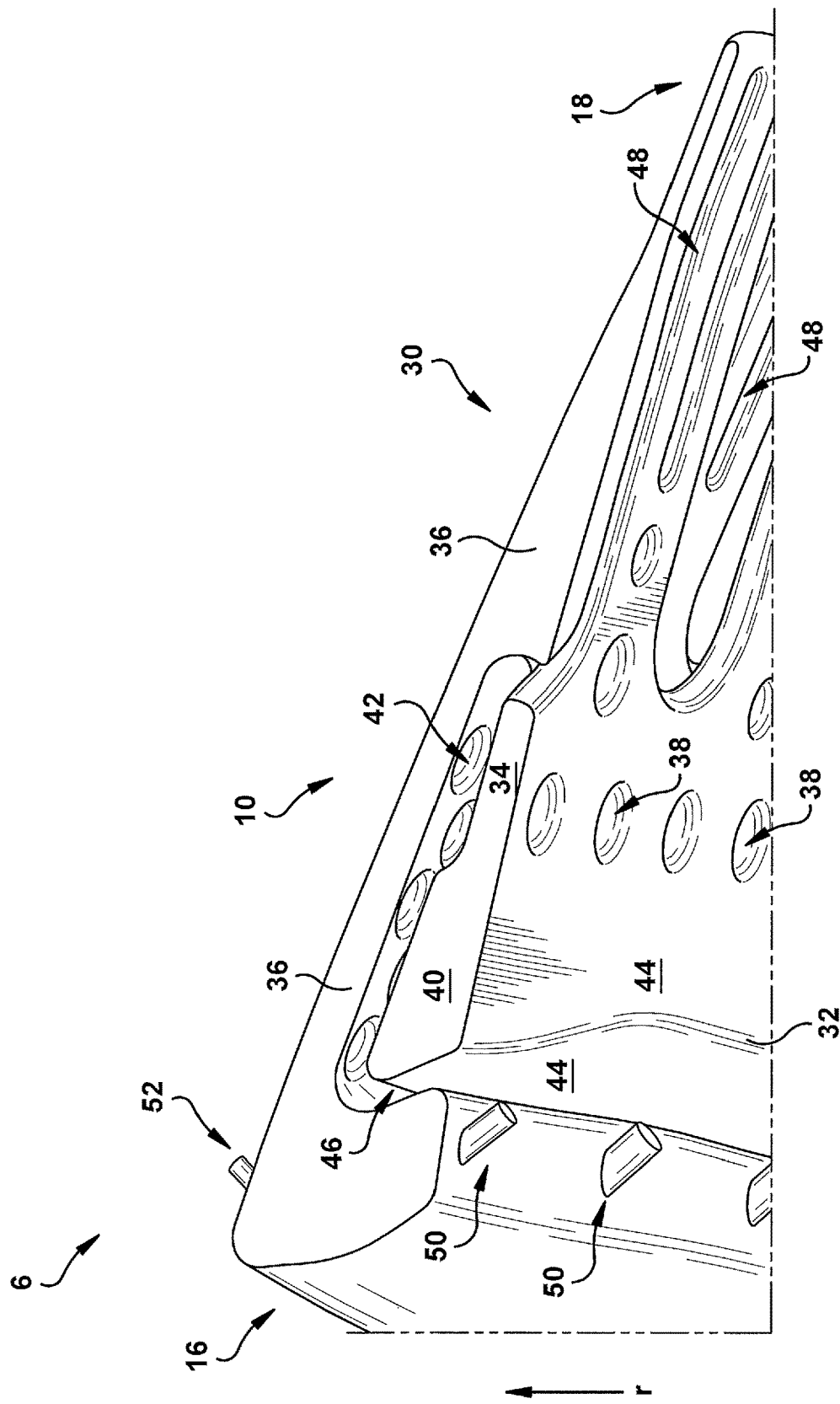
FIG. 4 is a cross-sectional view of a cooling circuit within the turbomachine blade of FIG. 1, taken along line X-X in FIG. 1.
Figure 5:
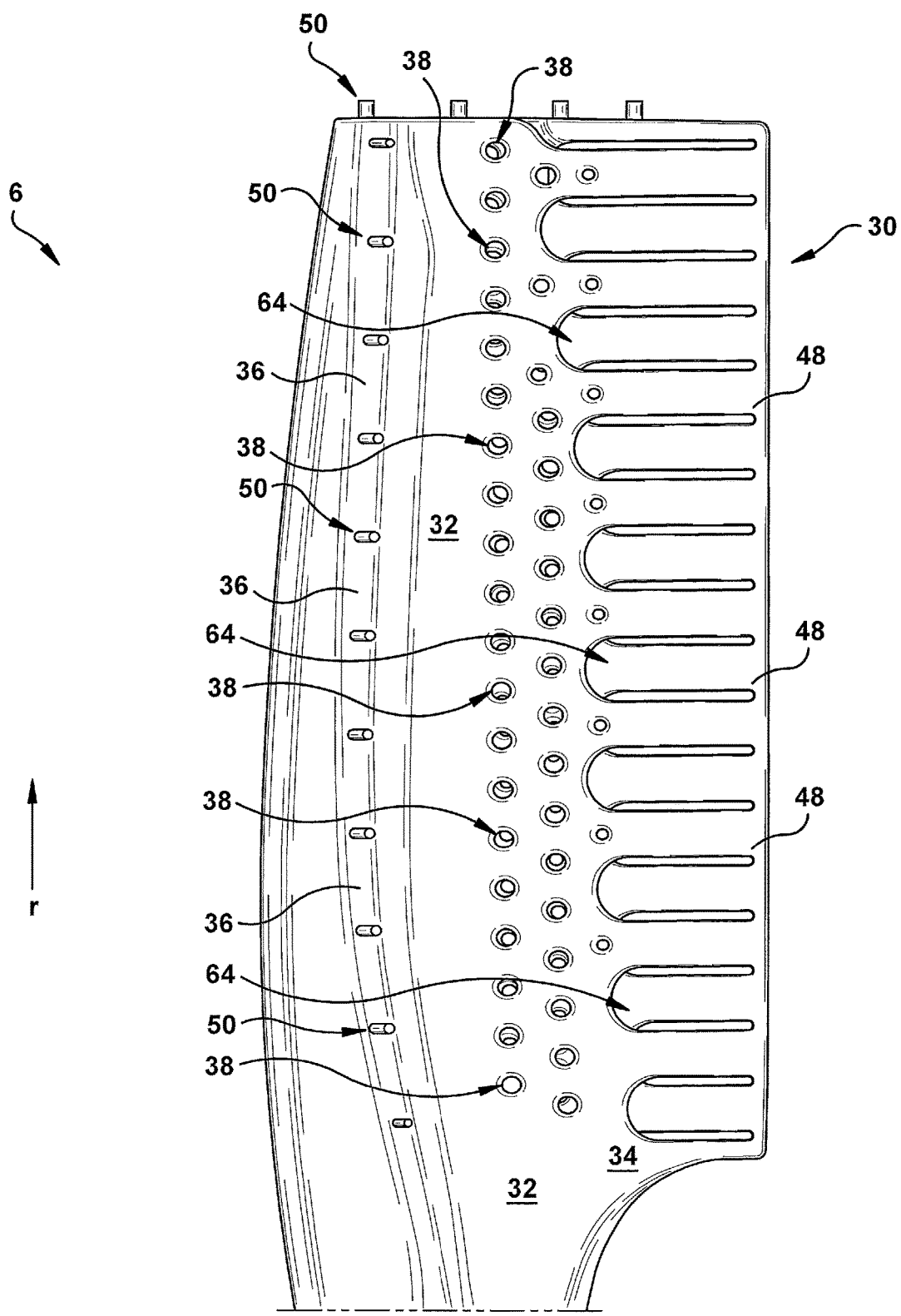
FIG. 5 illustrates a view of the interior body of the turbomachine blade of FIG. 1, along its pressure side.
Figure 6:
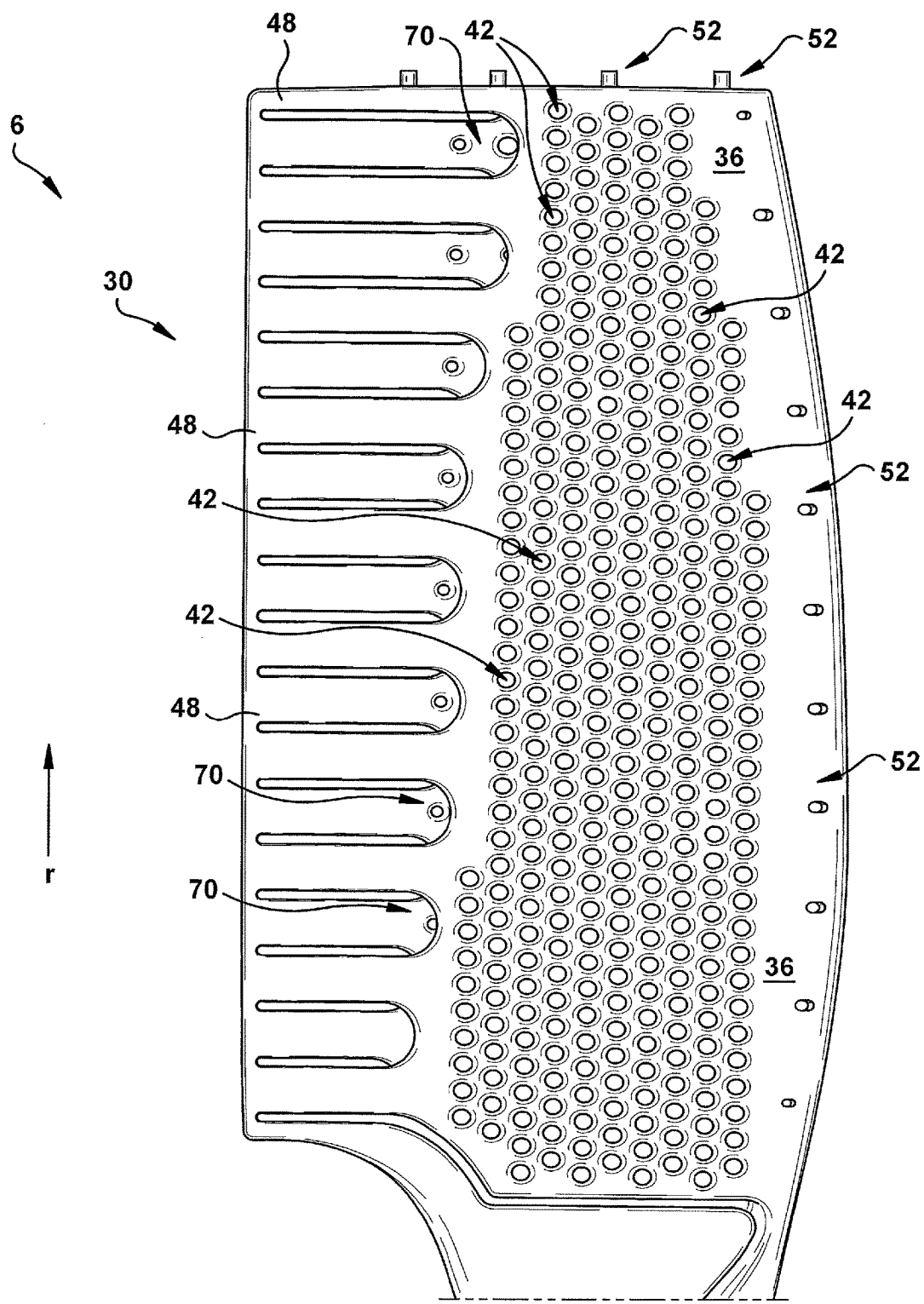
FIG. 6 illustrates a view of the interior body of the turbomachine blade of FIG. 1, along its suction side.

FIG. 2 shows a first cross-sectional view of body 6, through cross-section X"-X" from FIG. 1. FIG. 3 shows a second cross-sectional view of body 6, through cross-section X'-X', from FIG. 1. FIG. 4 shows a third cross-sectional view of body 6, through cross-section X-X, from FIG. 1. As can be seen from FIGS. 1-4, cross-section X"-X" is located proximate root 12, while cross-section X-X is located proximate tip 14. FIGS. 2-4 illustrate various features of a trailing edge cooling circuit 30, which is contained (substantially, that is, but for inlet and outlet apertures or passageways) within body 6 of turbomachine blade 2. FIGS. 5 and 6 illustrate cross-sectional views taken through body 6 in radial direction (viewed from circumferential perspective), that is, perpendicular to cross-sections X-X, X'-X' and X"-X". FIG. 5 illustrates a view of the interior of body 6 along pressure side 8, while FIG. 6 illustrates a view of the interior of body 6 along suction side 10. It is understood that FIGS. 2-6 show various features of a cooling circuit within body 6, such that heat transfer fluid, as described herein, flows within the cooling circuit and is not visible from this perspective. However, the flow of heat transfer fluid is illustrated in dashed lines in particular figures where beneficial for understanding the various aspects of the disclosure. Reference is made to FIGS. 1-6 interchangeably herein.

As shown, e.g., in FIGS. 2-4 trailing edge cooling circuit 30 can include a first section 32 extending from root 12 toward tip 14 along pressure side 8. Trailing edge cooling circuit (or simply, TE cooling circuit) 30 can also include a second section 34 extending from first section 32 toward trailing edge 18, and a third section 36 extending from trailing edge 18 along suction side 10. In various embodiments, TE cooling circuit 30 is configured to direct flow of a heat transfer fluid (e.g., cooling fluid such as water, air or gas) 60 from first section 32, through second section 34 and into third section 36, without releasing the heat transfer fluid 60 from body 6 at the trailing edge 18. As described herein, each section may have additional flow modification features, and portions of the heat transfer fluid may be redirected or otherwise employed while flowing through or between first section 32, second section 34 and/or third section 36.

Within second section 34 is a pressure side heat transfer element 38, which is configured to modify (e.g., disrupt) the flow of heat transfer fluid proximate a fluid passage 40 located between pressure side 8 and suction side 10. In various embodiments, pressure side heat transfer element 38 can include one or more pinbank(s), turbulator(s) (e.g., trip-strips), hump(s) or bump(s), with pinbanks illustrated in FIGS. 5-6 as an example. As shown in FIGS. 5-6, in various embodiments, pressure side heat transfer element 38 extends only partially radially between root 12 and tip 14, and may terminate radially prior to reaching root 12 and tip 14.

TE cooling circuit 30 can further include a suction side heat transfer element 42 within third section 36. Suction side heat transfer element 42 can modify (e.g., disrupt) flow of the heat transfer fluid through third section 36, where the fluid may flow to a set of film holes 52 fluidly connected with third section 36 proximate suction side 10. In various embodiments, suction side heat transfer element 42 can include one or more pinbank(s), turbulator(s) (e.g., trip-strips), hump(s) or bump(s), with pinbanks illustrated in FIGS. 5-6 as an example. In some cases, as shown in FIGS. 5-6, in various embodiments, suction side heat transfer element(s) 42 extends only partially radially between root 12 and tip 14, and may terminate radially prior to reaching root 12 and tip 14. As noted herein, in various embodiments, at least one of pressure side heat transfer element 38 or suction side heat transfer element 42 can include one or more bumps, dimples, turbulators or some combination thereof for modifying (e.g., disrupting) flow of the heat transfer fluid through the TE cooling circuit 30.

In various embodiments, fluid passage 40 can extend only partially radially between root 10 and tip 12, such that it radially terminates prior to contacting at least one of root 10 or tip 12. Fluid passage 40, as shown in FIGS. 2-4, can have a tapered volume that is greater proximate root 10 than it is proximate tip 12. In various embodiments, the volume of fluid passage 40 proximate tip 12 is approximately 50 percent or less of the volume of fluid passage proximate root 10, as measured from surrounding walls within body 6.

As shown in FIGS. 2-3, according to various embodiments, third section 36 is fluidly connected with first section 32 via second section 34, such that the second section 34 and third section 36 collectively wrap around an interior region 46 within trailing edge 18. In various embodiments, TE cooling circuit 30 also includes a set of fluid channels 48 extending through trailing edge 18 (within body 6) for permitting flow of heat transfer fluid. These fluid channels 48 can allow heat transfer fluid to flow therethrough, and also allow the heat transfer fluid to redirect back away from trailing edge 18 toward leading edge 16, and in some cases, passage 40.

In various embodiments, as shown in FIG. 5, blade 2 can further include a set of film holes 50 fluidly connected with the third section 36 proximate pressure side 8 of body 6. Film holes 50 can allow for the release of heat transfer fluid, e.g., for film cooling at nearby surfaces of body 6.

Referring simultaneously to FIGS. 1-6, a supply of heat transfer fluid (e.g., cooling air) 60, generated for example by a compressor 104 of a gas turbine system 102 (FIG. 11), is fed through the shank 4 (FIG. 1) to trailing edge cooling circuit 30 (e.g., via at least one cooling air feed). Heat transfer fluid 60 is fed radially outward into first section 32 along pressure side 8 of body 6. As heat transfer fluid 60 moves radially along first section 32, it flows aftward, partly radially, circumferentially and axially, to second section 34 and toward trailing edge 18, along pressure side heat transfer element 38, and toward trailing edge fluid channels 48. As blade 2 does not include trailing edge outlet apertures, heat transfer fluid 60 flowing through fluid channels 48 reaches trailing edge 18 and reverses course back into third section 36 along suction side 10 of body 6. Heat transfer fluid 60, as it flows through third section 36, can be recycled for other heat transfer purposes, or in some cases, may be ejected, e.g., for film cooling, proximate leading edge 16 at one or more of pressure side film holes 50 or suction side film holes 52. It is understood that heat transfer fluid 60 may generally flow in this manner as it wraps around the interior (e.g., interior space 46) of body 6 in a radial direction (e.g., away from shank 4).

Figure 7:
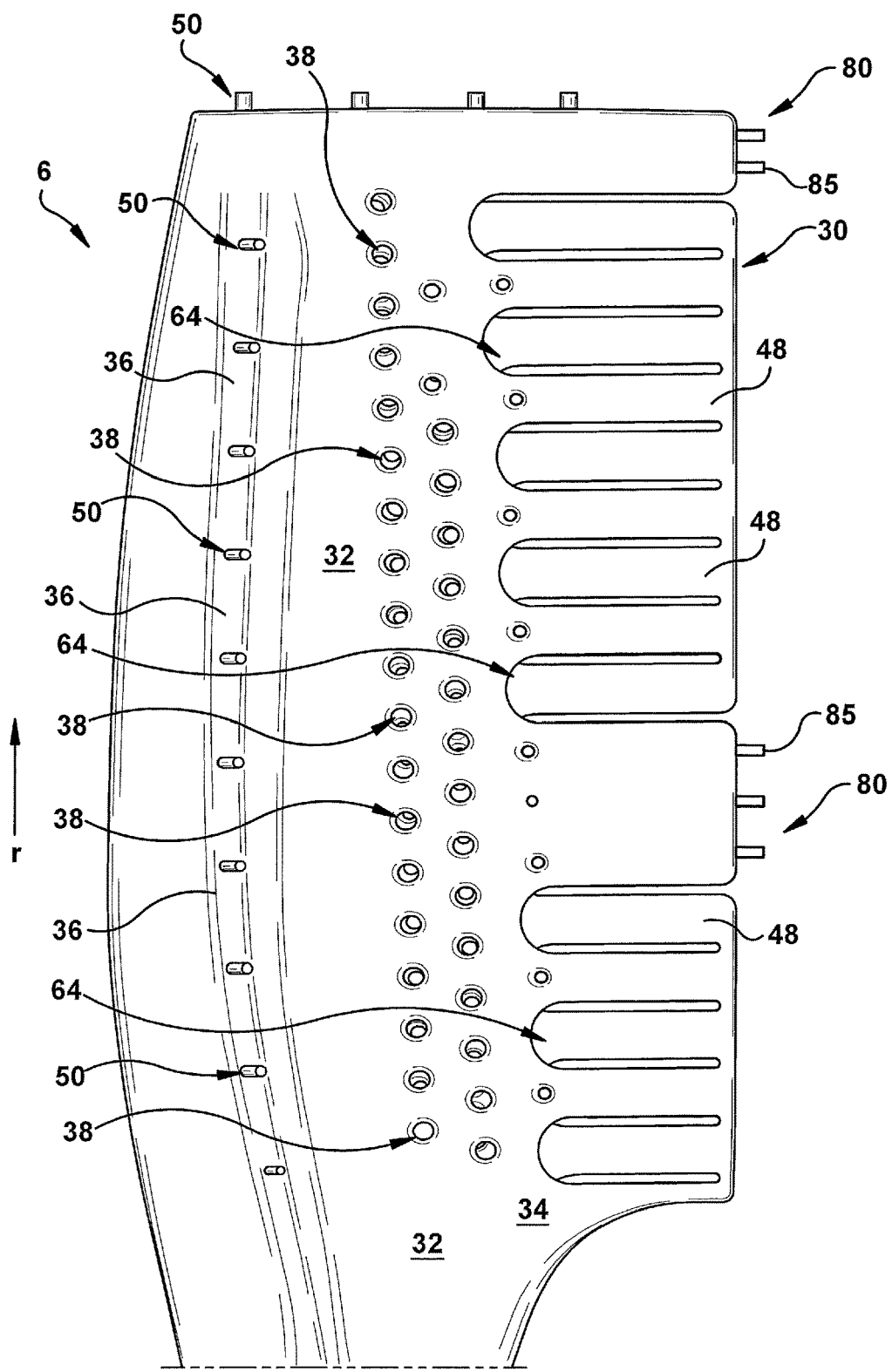
FIG. 7 illustrates a view of the interior body of an alternative turbomachine blade, along its pressure side.
Figure 8:
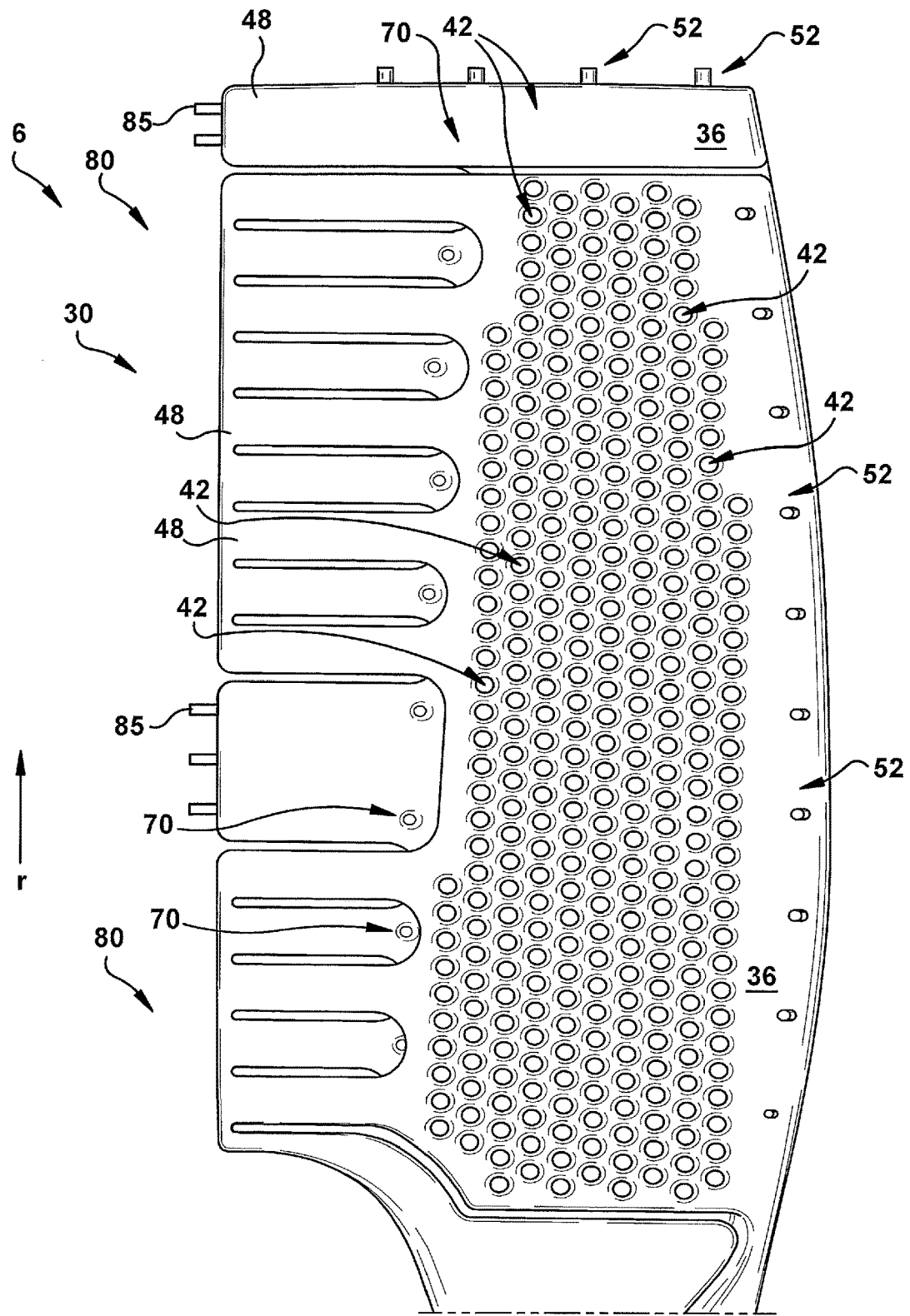
FIG. 8 illustrates a view of the interior body of the alternative turbomachine blade of FIG. 7, along its suction side.

In some alternative embodiments, as shown in schematic depictions in FIGS. 7 and 8, body 6 can further include outlet passages 80 at trailing edge 18 which extend only partially radially along body 6. Outlet passages 80 can include outlet apertures 85 fluidly connected with only a portion of fluid passage 40, for release of a portion of heat transfer fluid 60 to trailing edge 18. In some cases, fluid passage 40 can connect with outlet passageways 85 proximate root 12 or tip 14.

Figure 9:
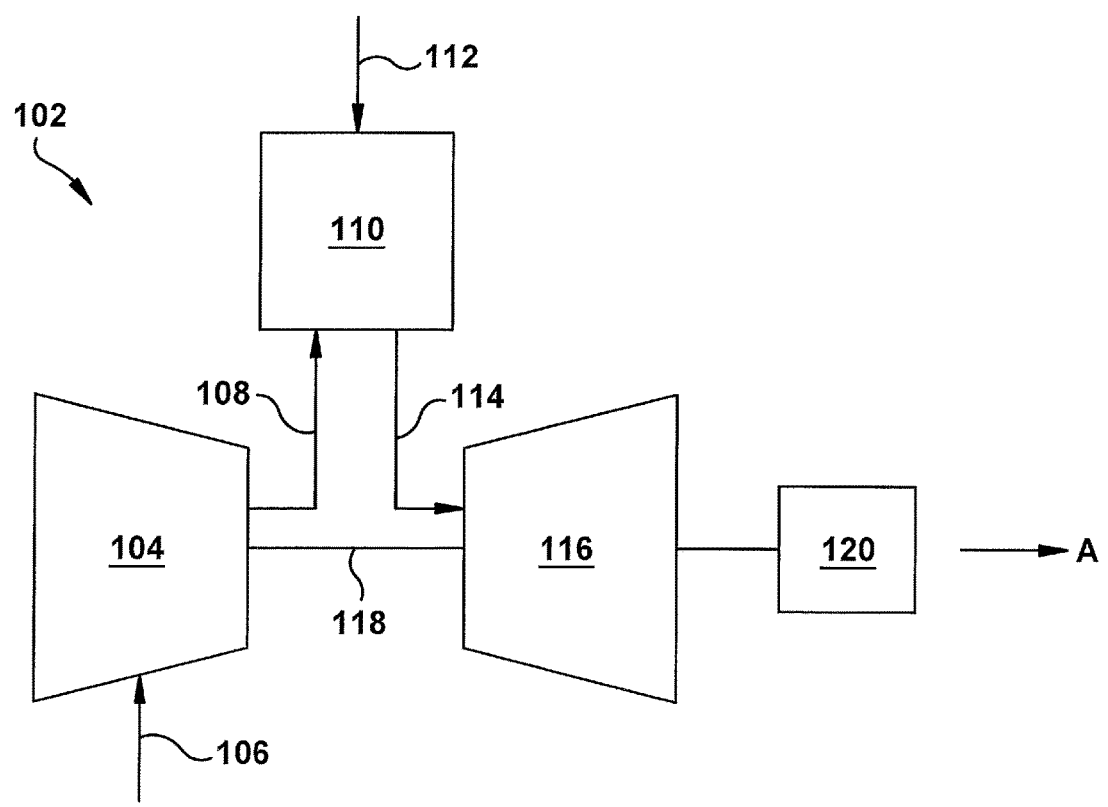
FIG. 9 is a schematic diagram of a gas turbine system according to various embodiments.

FIG. 9 shows a schematic view of a gas turbomachine 102 as may be used herein. Gas turbomachine 102 may include a compressor 104. Compressor 104 compresses an incoming flow of air 106. Compressor 104 delivers a flow of compressed air 108 to a combustor 110. Combustor 110 mixes the flow of compressed air 108 with a pressurized flow of fuel 112 and ignites the mixture to create a flow of combustion gases 114. Although only a single combustor 110 is shown, gas turbomachine 102 may include any number of combustors 110. The flow of combustion gases 114 is in turn delivered to a turbine 116, which typically includes a plurality of the turbomachine blades 2 (FIG. 1). The flow of combustion gases 114 drives turbine 116 to produce mechanical work. The mechanical work produced in turbine 116 drives compressor 104 via a shaft 118, and may be used to drive an external load 120, such as an electrical generator and/or the like.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., fastening, ultrasonic welding, bonding).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A turbomachine blade comprising:
    a body having: a leading edge; a trailing edge opposing the leading edge; a suction side extending between the leading edge and the trailing edge; a pressure side, opposing the suction side, extending between the leading edge and the trailing edge; a root; and a tip opposing the root; and
    a trailing edge cooling circuit contained within the body, the trailing edge cooling circuit including: a first section extending from the root toward the tip along the pressure side; a second section extending from the first section toward the trailing edge; and a third section extending from the trailing edge along the suction side,
    wherein the first section, the second section, and the third section are fluidly connected, and the second section and the third section collectively wrap around an interior region within the trailing edge, and
    wherein the trailing edge cooling circuit is configured to direct flow of a heat transfer fluid from the first section to the second section, and from the second section to the third section, without releasing the heat transfer fluid from the body at the trailing edge.

2. The turbomachine blade of claim 1, further comprising a pressure side heat transfer element within the second section for directing flow of the heat transfer fluid.

3. The turbomachine blade of claim 2, wherein the pressure side heat transfer element extends only partially radially between the root and the tip.

4. The turbomachine blade of claim 1, further comprising a suction side heat transfer element within the third section.

5. The turbomachine blade of claim 4, further comprising a set of film holes fluidly connected with the third section proximate the suction side.

6. The turbomachine blade of claim 1, wherein the first section includes a fluid passage extending only partially radially between the root and the tip.

7. The turbomachine blade of claim 6, wherein the fluid passage has a tapered volume between the root and the tip, wherein the tapered volume includes a larger volume proximate the root and a smaller volume proximate the tip.

8. The turbomachine blade of claim 1, further comprising an outlet passage connected with the trailing edge cooling circuit, the outlet passage located at the trailing edge of the body and extending only partially radially along the body.

9. The turbomachine blade of claim 1, further comprising a set of film holes fluidly connected with the third section proximate the pressure side.

10. A turbomachine comprising:
a gas turbine system including a compressor component, a combustor component, and a turbine component, the turbine component including at least one turbomachine blade including:
a body having: a leading edge; a trailing edge opposing the leading edge; a suction side extending between the leading edge and the trailing edge; a pressure side, opposing the suction side, extending between the leading edge and the trailing edge; a root; and a tip opposing the root; and
a trailing edge cooling circuit contained within the body, the trailing edge cooling circuit including: a first section extending from the root toward the tip along the pressure side; a second section extending from the first section toward the trailing edge; and a third section extending from the trailing edge along the suction side,
wherein the first section includes a fluid passage extending only partially radially between the root and the tip, and
wherein the trailing edge cooling circuit is configured to direct flow of a heat transfer fluid from the first section to the second section, and from the second section to the third section, without releasing the heat transfer fluid from the body at the trailing edge.

11. The turbomachine of claim 10, wherein the at least one turbomachine blade further includes a pressure side heat transfer element within the second section for directing flow of the heat transfer fluid.

12. The turbomachine of claim 11, wherein the pressure side heat transfer element extends only partially radially between the root and the tip.

13. The turbomachine of claim 10, wherein the at least one turbomachine blade further includes a suction side heat transfer element within the third section, wherein the at least one turbomachine blade further includes a set of film holes fluidly connected with the third section proximate the suction side.

14. The turbomachine of claim 10, wherein the at least one turbomachine blade further includes an outlet passage connected with the trailing edge cooling circuit, the outlet passage located at the trailing edge of the body and extending only partially radially along the body.

15. The turbomachine of claim 10, wherein the fluid passage has a tapered volume between the root and the tip, wherein the tapered volume includes a larger volume proximate the root and a smaller volume proximate the tip.

16. The turbomachine of claim 10, wherein the at least one turbomachine blade further includes a set of film holes fluidly connected with the third section proximate the pressure side.

17. A turbomachine blade comprising:
a body having: a leading edge; a trailing edge opposing the leading edge; a suction side extending between the leading edge and the trailing edge; a pressure side, opposing the suction side, extending between the leading edge and the trailing edge; a root; and a tip opposing the root; and
a trailing edge cooling circuit contained within the body, the trailing edge cooling circuit including:
a first section extending from the root toward the tip along the pressure side;
a second section extending from the first section toward the trailing edge;
a third section extending from the trailing edge along the suction side,
wherein the trailing edge cooling circuit is configured to direct flow of a heat transfer fluid from the first section to the second section, and from the second section to the third section, without releasing the heat transfer fluid from the body at the trailing edge;
a pressure side heat transfer element within the second section;
a suction side heat transfer element within the third section; and
a set of film holes fluidly connected with the third section proximate at least one of the suction side or the pressure side.

* * * * *